Oct. 23, 1956
H. L. BERKEY
2,767,412
COMBINED TOOL FOR CUTTING THREADS IN ONE
DIRECTION OF ROTATION AND COUNTERSINKING
IN THE REVERSE DIRECTION
Filed Nov. 26, 1952
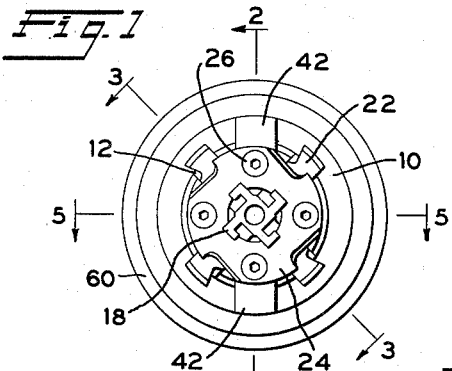
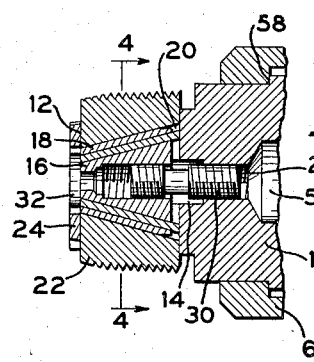
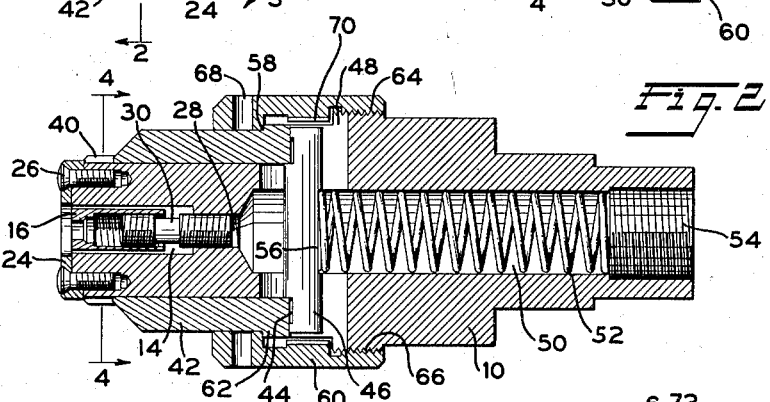
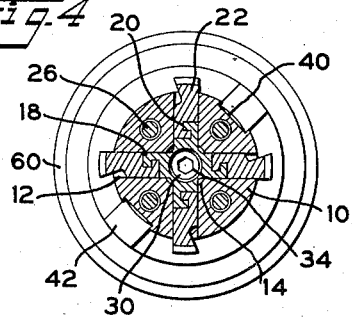
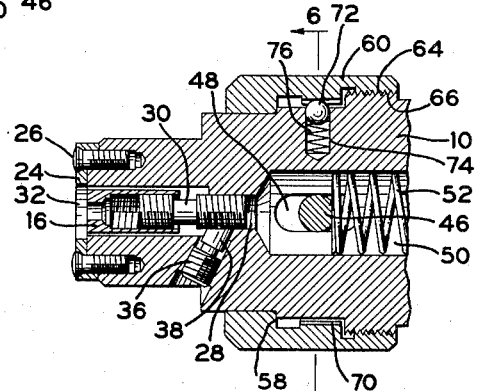
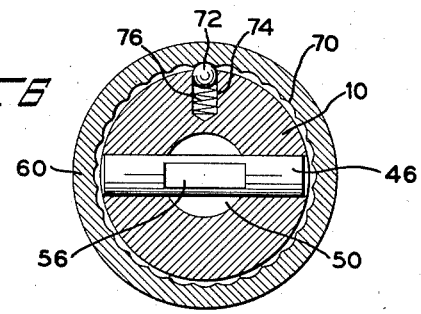
*INVENTOR.*
HARRY L. BERKEY
BY
Strauch, Nolan & Diggins
ATTORNEYS

United States Patent Office 2,767,412
Patented Oct. 23, 1956

2,767,412

COMBINED TOOL FOR CUTTING THREADS IN ONE DIRECTION OF ROTATION AND COUNTERSINKING IN THE REVERSE DIRECTION

Harry L. Berkey, Waynesboro, Pa., assignor to Landis Machine Company, Waynesboro, Pa., a corporation of Pennsylvania Application November 26, 1952, Serial No. 322,778

8 Claims. (Cl. 10—140)

This invention relates to thread-cutting taps and particularly to taps employing other machining tools in addition to thread-cutting chasers.

The combination of thread-cutting and other tools has presented difficulties in the past due to the varied conditions necessary to their proper operation. For instance, the total relative movement between tool and work for a chamfering operation is usually a small fraction of an inch, while the total relative movement between tool and work for a threading operation is equal to the length of the thread and is usually many times that for the chamfering operation. Hence, in former combinations of tapping and chamfering or other plain-surface, end-machining tools, the plain-surface tools have been located stationarily at a position to allow them to come into operation at the end of the threading operation.

The rate of relative axial movement between tool and work for the threading operation also greatly exceeds that for any end machining operation such as chamfering because the rate of relative axial movement between tool and work, in threading, is determined by the pitch of the thread produced, while, in end-machining operations, it is determined by the machineability of the material of the work. It is therefore apparent that, even though the end machining tools start cutting near the completion of the thread cutting operation, they cannot proceed axially at the same rate as the threading tools.

In collapsible taps this problem may be solved by first completing the thread-cutting operation and collapsing the tap. The end-machining tools can then be employed at a very much slower rate of axial feed than was used for threading. Relative axial withdrawal of tool and work takes place after the end-machining operation is finished.

The so-called solid type of tap, which does not collapse for rapid axial withdrawal after the threading operation, remains in engagement with the threads in the work during the withdrawal which is effected by reversing the direction of rotation of the tap. With the thread-cutting elements of the tap thus in constant engagement with the work, relative axial movement between tool and work in one direction or the other is constantly dictated by the pitch of the thread and no slow feed for chamfering or the like is possible.

Consequently, the chamfering or other tools have been designed to operate independently of the thread cutting tools, usually by some resilient means. Difficulties with the use of such mechanisms stem from the fact that heretofore, where a plurality of end-machining tools were used, they also operated independently of each other, with separate feed means. It has been found impossible, as a practical matter, to maintain precisely uniform cutting pressure on a number of separately fed tools with the result that one cutter does most of the work. This multiplies the wear on the working cutter, necessitates more frequent interruptions for sharpening and generally nullifies the advantages of using several cutters.

These and other disadvantages of prior tools have been obviated by the present invention, according to which the mechanism for adjusting the tap to the correct diameter is contained in the extreme forward part of the tap and the chamfering or other cutters are operatively connected for unitary adjustment and feeding action.

It is an object of the invention to provide a solid tap having novel mechanism for adjusting the chasers to the correct diameter together with a plurality of tools for forming the work end which are unitarily adjusted and fed into the work.

Another object is to provide, in a solid, diametrically adjustable tap, centrally located resilient means to exert equal pressure against a plurality of cutting tools other than the thread-cutting chasers.

A further object of the invention is to provide, in a solid, diametrically adjustable tap, tools for performing other machining operations on the work independently of the thread cutting operation and mechanism for adjusting the position of said tools as a unit independently of the diametrical adjustment and for limiting the movement of said tools under spring pressure.

Further objects and advantages will be apparent from a study of the following description of an embodiment of the invention and the accompanying drawings, in which Figure 1 is a front end elevation of a tap according to my invention, Figure 2 is a longitudinal sectional view taken on line 2—2 of Figure 1, Figure 3 is a partial longitudinal sectional view taken on line 3—3 of Figure 1.

Figure 4 is a transverse sectional view taken on line 4—4 of Figures 2 and 3.

Figure 5 is a partial longitudinal sectional view taken on line 5—5 of Figure 1, and Figure 6 is a transverse sectional view taken on line 6—6 of Figure 5.

Referring now to the drawings, the tap of the present invention comprises a body 10 having at the rear or right hand end thereof, as seen in Fig. 2, provision for connection in well known manner to the spindle of a machine tool. This spindle will, of course, be reversible in its direction of rotation so that the tap may be backed out of the finished thread. The tap body 10 is provided at its forward end with a plurality of radial slots 12 communicating with a central bore 14 (see Figs. 3 and 4). A plunger member 16 is disposed in bore 14 and has tongues 18 extending into the slots 12 and engaging therein grooves 20 in a plurality of thread-cutting chasers 22.

The interfitting tongues 18 of the plunger 16 and grooves 20 of chasers 22 are inclined to the axis of the tap in the longitudinal direction as seen so that when plunger 16 is moved to the left as seen in Figure 3, chasers 22 are moved radially toward the center of the tap and vice versa. A cap member 24 is secured to the nose of body member 10 by means of screws 26 to restrain chasers 22 against movement axially of the tap and to retain them in the slots 12. The structure so far described is well known in the art. The remaining description will relate to the novel features of the invention.

Rearwardly of bore 14, a threaded hole 28 is formed in tap body 10 to receive one end of a stud 30, the forward end of which is threadedly engaged in a centrally located, threaded recess in plunger 16. This stud 30 is employed to adjust the axial position of plunger 16 relative to tap body 10 and hence to adjust the radial position of chasers 22 to the required diameter. Such adjustment is made possible by making the mating threads of stud 30 and plunger 16, single lead threads while the mating threads of stud 30 and opening 28 are made with double lead. Thus relative axial movement between plunger 16 and tap body 10 will occur upon rotation of stud 30. An opening 32 in cap member 24 and a polygonal socket 34 in the forward end of stud 30 are provided to facilitate rotation of the latter. A set screw 36 and a plug 38 (Fig. 5) may be disposed in an opening in tap body 10 communicating with opening 28, for the purpose of locking stud 30 in adjusted position.

A plurality of shallow slots 40 are formed in tap body 10 between the chaser slots 12 to support in operative position chamfering cutters 42. It should be understood that the invention is not restricted to any particular number or type of tool so that tools 42 may be for the purpose of performing any auxiliary or secondary machining operation upon the work piece. As shown, the cutters 42 are for the purpose of forming a chamfer on the interior of the work piece at the outer edge of the finished threads.

The rearward ends of cutters 42 are seated in notches 44 formed at the opposite ends of a pin 46 which is disposed transversely in an elongated slot 48 (see Figs. 2 and 5) in the tap body 10. Thus the pin 46 is capable of limited movement axially of the tap, being held against rotation by the slot 48. It will also be apparent that the cutters 42 are thus constrained to move forwardly exactly the same amount that pin 46 moves in that direction.

Rearwardly of tapped hole 28, the tap body 10 is formed with central cylindrical recess 50 in which is disposed a compression spring 52. The rear end of recess 50 is closed by the screw 54, threadedly engaged in the interior of tap body 10, so that spring 52 is held in compression between screw 54 and the pin 46 which is flattened as at 56 to provide a seat for the spring 52. It will be seen that spring 52 urges pin 46 and the cutters 42 in the forward direction.

The movement of cutters 42 in the forward direction is limited by an internal shoulder 58 of the adjusting ring 60 which engages a radial extension 62 on each cutter 42. Ring 60 surrounds tap body 10 and has an internally threaded portion 64 mating with an external thread 66 formed on the circumference of the tap body. Therefore, the extreme forward position of cutters 42, relative to tap body 10 and to chasers 22, can be adjusted by rotation of the adjustable ring 60. Spanner holes 68 or other means may be provided for rotating ring 60.

The means for locking ring 60 in adjusted position is shown in Figures 5 and 6. A portion of the interior of ring 60 is provided with arcuate axial grooves 70 arranged to cooperate with a ball 72 to lock ring 60 against accidental rotation. Ball 72 is mounted in a radially directed recess 74 in tap body 10 and is urged outwardly into contact with the grooves 70 by means of a compression spring 76 seated beneath it in the recess 74. It will be noted that this locking mechanism offers no appreciable resistance to intentional rotation of ring 60 and that the ball 72 is in contact with some part of one of the grooves 70 over the entire range of axial adjustment of ring 60.

In the operation of the device, it is first necessary to determine the number of revolutions of the tap which will be necessary for the resiliency mounted tools 42 to perform their desired function. If, for example, this number is fixed as 3 by the experience of the operator and if the lead of the thread being cut is 16 threads per inch, a 3/16" axial movement of the tap body 10 is necessary to perform the chamfering operation. Ring 60 is accordingly rotated to adjust the axial position of the tools 42 so that they will first contact the work piece when 3/16" of the thread remains to be formed by the chasers 22.

Since it has been found preferable to cause the tools 42 to operate on the return stroke of the tap, they are sharpened to cut when the tap is rotating in the direction opposite to that used to cut the thread. Consequently, as the threading operation proceeds, the tools 42 make contact with the forward edge of the work piece and then ride upon that edge without cutting until the threading operation is completed. Meanwhile, the cutters 42 are forced rearwardly relative to the rest of the tap, compressing the spring 52.

At the end of the threading operation, the direction of rotation of the tap is reversed to unscrew it from the tapped hole. This permits the cutting edges of the tools 42 to come into operation, performing their desired function under the accumulated pressure of spring 52 while the tap is withdrawn from the work. Upon completion of the chamfering operation, the extensions 62 of tools 42 are engaged by the shoulder 58 of ring 60 and the cutting edges of the tools are removed from contact with the work piece in the continued withdrawal of the tap.

It will be understood that the operation of the tap is the same whether the workpiece is fixed and the tap is rotated or the tap is fixed and the workpiece is rotated and the present invention encompasses both methods of effecting relative movement between the tap and the workpiece.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a combined threading and cutting tool, a body, chasers mounted in said body for radial movement toward and away from the axis of said body, and operative to cut threads on a work piece when said body and said work piece are relatively rotated in one direction, means for adjusting the radial position of said chasers, a plurality of cutting tools means mounting said tools independently in said body for axial movement with respect thereto, said cutting tools having a cutting edge disposed on the trailing edge of said cutters with respect to the thread cutting direction of rotation whereby said cutting tools are ineffective when said body and said work piece are relatively rotated in said one direction and are effective only upon relative reverse rotation of said body and said work piece, means fixing said tools against radial movement with respect to said body, means resiliently urging each of said cutting tools in one axial direction, and means independent of the chaser adjusting means adjustably limiting the movement of said tools in said one axial direction.

2. In a combined threading and cutting tool having a body and thread cutting chasers mounted in said body for radial adjustment with respect to the axis thereof and operative to cut threads on a work piece when said body and said work piece are relatively rotated in one direction, a plurality of cutting tools, means independently mounting said tools on said head for axial movement with respect thereto while fixing said tools against radial movement, said cutting tools having a cutting edge disposed on the trailing edge of said cutters with respect to the thread cutting direction of rotation whereby said cutting tools are ineffective when said body and said work piece are relatively rotated in said one direction and are effective only upon relative reverse rotation of said body and said work piece, cooperating means on each of said tools and said body for establishing an adjustable normal axial position of said tools, and means resiliently urging said cutting tools toward said normal position.

3. In a combined threading and cutting tool having a body, chasers mounted in said body for radial movement toward and away from the axis of said body, and operative to cut threads on a work piece when said body and said work piece are relatively rotated in one direction, a first adjusting means for adjustably positioning said chasers, a plurality of cutting tools means mounting said tools on said body for axial movement with respect thereto, said tools being fixed against radial movement, said cutting tools having a cutting edge disposed on the trailing edge of said cutters with respect to the thread cutting direction of rotation whereby said cutting tools are ineffective when said body and said work piece are relatively rotated in said one direction and are effective only upon relative reverse rotation of said body and said work piece, a second adjusting means independent of said first adjusting means for determining the axial position of said cutting tools as a unit, and yielding means independent of said first adjusting means for resiliently urging said tools toward said adjusted position.

4. In a combined threading tap and cutting tool having a body and chasers mounted in said body for movement toward and away from the axis of said body, and operative to cut threads on a work piece when said body and said work piece are relatively rotated in one direction, a plurality of cutting tools mounted for reciprocating movement along grooves formed in an external surface of said body, said cutting tools having a cutting edge disposed on the trailing edge of said cutters with respect to the thread cutting direction of rotation whereby said cutting tools are ineffective when said body and said work piece are relatively rotated in said one direction and are effective only upon relative reverse rotation of said body and said work piece, means forming a radially directed abutment on said tools normal to the axis of said body, an adjusting ring mounted on said body, said ring having a radially directed shoulder adapted to engage said abutments on said tools, a pin extending through a diametral slot in said body, the opposite ends of said pin being adapted to engage rearward ends of said tools, and a compression spring mounted in a central bore in said body adapted to yieldingly urge the ends of said pin against said tools to urge said abutments toward said shoulders on said adjusting ring.

5. In a combined threading and cutting tool having a body and a plurality of chasers mounted in said body for movement toward and away from the axis of said body; means for adjusting the radial position of said chasers, and operative to cut threads on a work piece when said body and said work piece are relatively rotated in one direction, a plurality of cutting tools mounted for movement along axially extending grooves formed in an external surface of said body, said cutting tools having a cutting edge disposed on the trailing edge of said cutters with respect to the thread cutting direction of rotation whereby said cutting tools are ineffective when said body and said work piece are relatively rotated in said one direction and are effective only upon relative reverse rotation of said body and said work piece, an adjusting ring threadedly mounted on said body, said ring having a cylindrical surface formed about the axis of said body engageable with the outer surface of said tools to maintain the latter in said grooves, cooperating oppositely facing radially extending shoulders on said tools and said ring, said faces being in a plane normal to the axis of said tool and means yieldingly connected to each of said tools to resiliently urge said cooperating shoulders into engagement.

6. In a combined threading and cutting tool; a body; a plurality of chasers operative to cut threads on a work piece when said body and said work piece are relatively located in one direction; means mounting said chasers in said body for radial movement toward and away from the axis of said body; adjusting means for said chasers comprising a plunger reciprocably mounted in a centrally axially extending bore in said body and operatively connected to said chasers to move the latter toward and away from the axis of said body, and an adjusting stud having single and double threads, respectively, at its opposite ends, one of said threads engaging mating threads in said plunger and the other of said threads engaging mating threads in said body whereby rotation of said stud will adjust the axial position of said plunger with respect to said body and thereby adjust the radial position of said chasers; a plurality of cutting tools means independently mounting said tools on said body for axial movement with respect thereto while fixing said tools against radial movement with respect to said body, said cutting tools having a cutting edge disposed on the trailing edge of said cutters with respect to the thread cutting direction of rotation whereby said cutting tools are ineffective when said body and said work piece are relatively rotated in said one direction and are effective only upon relative reverse rotation of said body and said work piece; means resiliently urging each of said cutting tools in one axial direction, and means independent of said chaser adjusting means adjustably limiting the movement of said tools in one axial direction.

7. In a tool for threading and cutting a workpiece, a body, chasers mounted in said body for radial movement toward and away from the axis of said body, means for relatively rotating and longitudinally moving said tool with respect to said workpiece in one direction to thread said workpiece, and then in the other direction to separate said tool and said workpiece, a plurality of cutters mounted on said body for movement along the longitudinal axis thereof, said cutters having a cutting edge effective only when said tool is relatively rotated in said other direction, means resiliently urging said cutters toward said workpiece, whereby during the threading operation said cutters ride on said workpiece and said resilient means is compressed and said cutters cut said workpiece as said tool is separated from said workpiece, said cutters being held against said workpiece by said resilient means.

8. In a tool for threading and cutting a work piece, a body, a plurality of chasers mounted in said body, means for rotating said tool in one direction and advancing said chasers into threading relation with said workpiece to thread said workpiece and for reversing and withdrawing said tool from said workpiece, a plurality of cutters, means mounting said cutters for longitudinal movement along the axis of said body, and resilient means yieldingly urging said cutters toward said workpiece, said cutters having a cutting edge disposed on the trailing edge of the cutters with respect to the thread cutting direction of rotation whereby said cutting edge is effective only when said tool is reversed and withdrawn from said workpiece whereby said cutters will ride on said workpiece during the threading thereof and will cut said workpiece when said tool is reversed and withdrawn therefrom.

References Cited in the file of this patent

UNITED STATES PATENTS

| | | |
|---|---|---|
| 1,041,675 | Robinson | Oct. 15, 1912 |
| 1,100,984 | Murchey | June 23, 1914 |
| 1,331,138 | Baldwin | Feb. 17, 1920 |
| 1,435,695 | Breitenstein | Nov. 14, 1922 |
| 1,501,117 | Johnson | July 15, 1924 |
| 1,643,264 | Wetmore | Sept. 20, 1927 |

FOREIGN PATENTS

| | | |
|---|---|---|
| 105,309 | Australia | Oct. 13, 1938 |
| 552,557 | Germany | June 15, 1932 |